United States Patent [19]

Connett et al.

[11] Patent Number: 4,529,562
[45] Date of Patent: Jul. 16, 1985

[54] METHOD AND APPARATUS FOR MANUFACTURING A THERMALLY INSULATED BUILDING BLOCK

[75] Inventors: Peter Connett; Michael Connett, both of Manchester; James B. Blackwell, Adlington, all of England

[73] Assignee: Beamech Group Limited, Salford, England

[21] Appl. No.: 448,990

[22] PCT Filed: Mar. 31, 1982

[86] PCT No.: PCT/GB82/00098
§ 371 Date: Nov. 26, 1982
§ 102(e) Date: Nov. 26, 1982

[87] PCT Pub. No.: WO82/03358
PCT Pub. Date: Oct. 14, 1982

[30] Foreign Application Priority Data
Apr. 3, 1981 [GB] United Kingdom ............... 8110549

[51] Int. Cl.³ .............................................. B29D 27/04
[52] U.S. Cl. .................................... 264/464; 52/309.9; 52/309.12; 52/309.17; 52/612; 264/39; 264/40.6; 264/45.5; 264/338; 425/127; 425/144; 425/817 R
[58] Field of Search ................... 264/46.6, 46.4, 46.5, 264/338, 39, 45.5, 40.6; 52/309.8, 309.9, 309.12, 309.4, 309.17, 612; 425/123, 127, 817 R, 144

[56] References Cited

U.S. PATENT DOCUMENTS

| | | | |
|---|---|---|---|
| 2,888,360 | 5/1959 | Sherts et al. | 52/309.12 X |
| 3,332,187 | 7/1967 | Arcari | 52/309.12 |
| 3,511,008 | 5/1970 | Grems et al. | 52/309.8 |
| 3,629,384 | 12/1971 | Elgenstierna | 264/46.5 X |
| 3,646,715 | 3/1972 | Pope | 52/309.9 |
| 4,130,973 | 12/1978 | Gustavsson | 264/46.6 X |
| 4,151,239 | 4/1979 | Ogden | 264/46.6 |
| 4,371,486 | 2/1983 | Ogden | 264/46.6 |

FOREIGN PATENT DOCUMENTS

| | | | |
|---|---|---|---|
| 711888 | 6/1965 | Canada | 52/309.17 |
| 2119358 | 11/1972 | Fed. Rep. of Germany . | |
| 2535606 | 2/1977 | Fed. Rep. of Germany | 52/612 |
| 2545206 | 4/1977 | Fed. Rep. of Germany | 52/309.4 |
| 2614512 | 10/1977 | Fed. Rep. of Germany . | |
| 2730075 | 1/1979 | Fed. Rep. of Germany | 264/46.6 |
| 2237018 | 2/1975 | France | 52/612 |
| 2254945 | 7/1975 | France . | |
| 2308751 | 11/1976 | France | 52/612 |
| 2311148 | 12/1976 | France . | |
| 2394647 | 2/1979 | France | 52/309.12 |
| 50-8249 | 4/1975 | Japan | 52/309.4 |
| 451461 | 5/1968 | Switzerland . | |
| 2027089 | 2/1980 | United Kingdom | 52/309.4 |

*Primary Examiner*—Philip Anderson
*Attorney, Agent, or Firm*—Walter C. Farley

[57] ABSTRACT

A method of manufacturing a thermally insulated building block (54a) comprises foaming a quantity of foamable plastics material in an enclosed space (56) between a building block (54) and a closure means (52), the quantity of material being sufficient to fill the enclosed space (56). The foamable material may be injected into a cavity in the block onto an outer surface of the block (54) or onto the closure means (52) prior to locating the block (54) and closure means (52) relative to each other to form the enclosed space (56) therebetween. The block (54) is transported between upper and lower parallel endless belts (55, 50) during foaming and either belt (55, 50) may provide the closure means (52). If the lower belt (50) provides the closure means (52) the upper belt (55) maintains the block (54) in contact with the closure means (52) during foaming.

10 Claims, 3 Drawing Figures

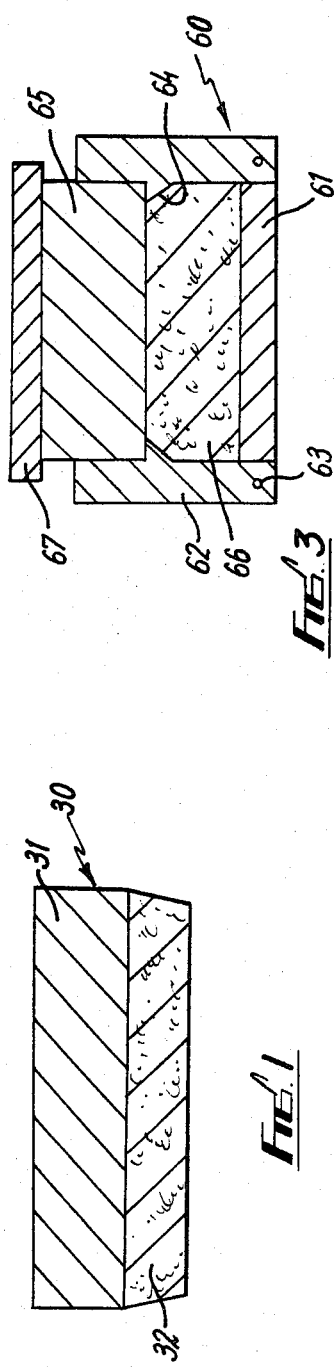
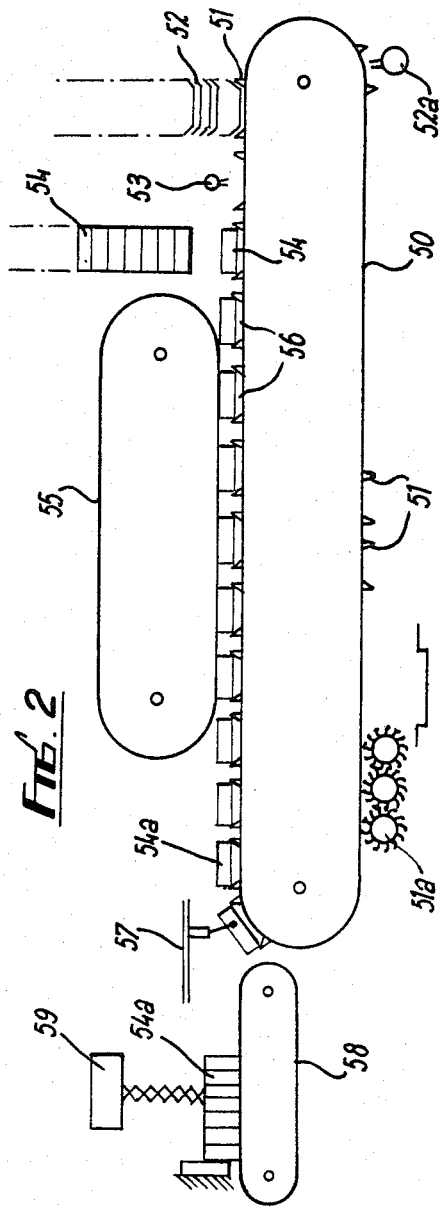

METHOD AND APPARATUS FOR MANUFACTURING A THERMALLY INSULATED BUILDING BLOCK

TECHNICAL FIELD OF THE INVENTION

This invention relates to the production of blocks bricks and tiles such as are used in the construction industry, and in particular to such blocks or the like having good thermal insulation properties by virtue of thermally insulating material being incorporated therein.

STATE OF THE ART

Building blocks and the like of this type, hereinafter referred to generally as blocks, are used in wall construction for example to form one or both walls of a cavity wall.

In order to improve the thermal insulation properties of such blocks it is known to provide, as an alternative to simply increasing their thickness, a cavity or cavities in the block which may be filled with a material such as a foamed plastics material, rock wool or the like insulating material. However the filling of the cavities with previously foamed material or material such as rock wool is a time consuming operation, thus adding to the production costs.

Also such materials are not secured to the material of the block and as a consequence tend to be omitted from an open sided cavity such as occurs in the case of a block cut to fit in a space which is smaller than will accommodate a full-size block. To overcome the former problem foamable plastics material may be injected into the cavity or cavities in the block and allowed to foam in situ. However the foaming of the material produces a domed surface at the open end of the cavity, and in order to provide that the foam material extends to the extremities of the cavity a considerable excess of material must be injected and the subsequently protruding domed portion must be cut off in order that the blocks may be stacked or used for building purposes. This process is wasteful of the plastics material and requires that the block must stand for an appreciable period of time after the foaming step before the foamed material is in a suitable condition for cutting. As a consequence the cost of block production by this method is increased unduly.

Another disadvantage of blocks of the abovementioned type is that there is an appreciable loss of thermal insulation in the regions of the block which form the walls of the cavities and provide a thermal path through the block. In order to overcome this problem many elaborate arrangements of cavities within such blocks have been proposed, such arrangements providing that the thermal path through the block is tortuous and relatively long by comparison with the thickness of the block in order to reduce the heat transference therethrough. However such blocks are difficult to produce, and therefore costly, and do not overcome the problem to an acceptable extent. It is an object of the invention to provide a building block in which the above problem is overcome or at least substantially reduced.

As an alternative to the use of the insulated blocks described above, it is known to fill the cavity between the inner and outer walls of the cavity wall construction with a foamed plastics material. However, the foamed material forms a bridge between the inner and outer walls and can lead to condensation or water ingress problems in certain circumstances. In consequence, alternative methods of construction of a thermally insulated cavity wall have been sought. One alternative which has been proposed is that of placing in the cavity between the inner and outer wall a sheet of thermally insulating material and securing such sheet to the inner wall during building. However, such a solution has not been readily accepted by builders since it is time consuming. Furthermore, the sheet can become detached from the inner wall after a period of time and can then form a bridge between the inner and outer walls so that water ingress problems can result.

It is also known to secure to the inner surface of the inner wall a sheet of thermally insulating material, but this is usually done, if at all, by the owner or occupier of the property and not by the builder, since it may not be desirable in all cases depending upon the nature of the property, any fixtures or fittings to be secured to the wall, the type of wall covering if any to be applied to the wall by the owner or occupier or for other reasons. Hence, in most cases thermal insulation of this type is not provided at all.

DISCLOSURE OF THE INVENTION

The invention provides a method of manufacturing a thermally insulated building block comprising the steps of locating a closure means and a building block relative to each other to provide an enclosed space containing a predetermined quantity of a foamable plastics material, allowing said foamable material to foam within said enclosed space and then separating said closure member and the thus formed thermally insulated block, said predetermined quantity being sufficient for said plastics material to fill said enclosed space when foamed.

The enclosed space is defined by an outer surface of the block and the closure member. In this case the plastics material will be secured to the outer surface of the block so as to form a laminate therewith. By this means the problem of a thermal path extending between the opposed sides of the insulated block is overcome. Due to the pressure exerted within the enclosed space during foaming the plastics material is forced into the generally pitted surface of the building block, thus forming an excellent mechanical key between the insulating material and the block.

The invention also provides a thermally insulated building block comprising a building block having bonded thereto on one face thereof a block of foamed plastics material. The foamed plastics material is bonded to the building block by means of a physical bond formed by foaming said plastics material in an enclosed space formed by said one face and a closure member. The one face is an outer surface of the block. In the latter case the bonding may be aided by an adhesive in addition to the physical bond.

The invention also provides apparatus for use in the manufacture of a thermally insulated building block comprising means for supplying a predetermined quantity of a foamable plastics material, a closure means, means for locating said closure means and a building block relative to each other to provide an enclosed space containing said quantity of plastics material, means maintaining said closure means and said block in said relative location whilst said plastics material is foamed, said predetermined quantity being sufficient for said plastics material to fill said enclosed space when foamed, and means for separating said closure member and the thus formed thermally insulated block.

The apparatus may comprise conveyor means for supporting the block during the foaming step. The apparatus may also comprise an endless belt and said endless belt may comprise the closure means. Alternatively said endless belt may comprise said means maintaining the closure means and the block in said relative location whilst the plastics material is foamed and said conveyor means comprise said closure means.

BRIEF DESCRIPTION OF THE DRAWINGS

FIG. 1 is a sectional elevation of a block having a block of foamed material bonded to an outer face;

FIG. 2 is a diagrammatic illustration of apparatus for use in forming the block of FIG. 1; and FIG. 3 is a sectional elevation of an alternative form of closure means in the apparatus of FIG. 2.

BEST MODE OF CARRYING OUT THE INVENTION

The invention provides an insulated block 30 as shown in FIG. 1. The insulated block 30 comprises a building block 31 having a rigid block of foamed plastics insulating material 32 bonded to one face. The insulated block 30 has several advantages over the blocks having foam filled cavities therein. For the same structural strength and insulation properties the block 31 can be thinner than blocks having foam filled cavities therein, thus enabling the block manufacturer to produce more blocks per pallet and thereby increase production and reduce production costs per block. Furthermore, since there are no cavities, the block 31 is easier to manufacture and higher density block aggregates may be used than in the case of blocks having foam filled cavities therein. In addition the thermal transmittance through the block is substantially uniform and the thermal bridges in block 30 are reduced. In consequence, for the same overall thermal performance of block 30 less foamable material 32 is required than in the case of blocks having foam filled cavities therein. thus further reducing production costs.

The block of foamed material 32 may be bonded to block 31 by means of adhesive in addition to the present method of producing block 30 which comprises foaming the material 32 in contact with block 31 whilst in an enclosed space. By this means adhesive may not be required and an excellent mechanical keying of the material 32 to the block 31 may be achieved by the pressure created during foaming forcing material 32 into the generally pitted surface of block 31.

In FIG. 2 there is shown apparatus for producing block 30 by this method, comprising a bottom conveyor 50 by which a number of mould units 51 are conveyed through the apparatus. The mould units 51 may form moulds for the foamable material, or may retain moulds or mould liners 52 as shown, in which case the moulds or mould liners 52 are dispensed individually into mould units 5 as conveyor 50 is in motion. The mould 52 then has a quantity of foamable material injected therein by injector 53 and a block 54 from a supply thereof is placed into the mould 52 by a dispensing means (not shown). The conveyor 50 conveys the mould unit 51 and the mould liner 52 and block 54 beneath top conveyor 55, and the foamable material is allowed to foam to fill the enclosed space 56 formed between block 54 and the base and inclined sides of mould 52. The mould walls may be of or lined with a deformable material to facilitate the block edges seating therein to effect good sealing of the space 56. Top conveyor 55 prevents lifting of the blocks 54 from the mould 52 so that space 56 is completely filled and the foaming material is bonded to block 54. Again the speed of conveyor 50 is such that foaming is substantially completed by the time that blocks 54 emerge from beneath top conveyor 55. A stacking unit 57 places insulated blocks 54a onto off-loading conveyor 58 from which they are removed by means of a lift-off electric hoist 59. If moulds or mould liners 52 are used they may be returned to the loading position for re-use their release from mould units 51 being facilitated by the prior spraying at 52a with a suitable release agent. If no such moulds or mould liners 52 are used and the mould units 51 constitute the moulds proper then they may be cleaned by cleaning means 51a if desired.

Instead of mould units 51 or moulds 52 having inclined sides as shown in FIG. 2, they may be provided with upstanding sides as shown in FIG. 3. In FIG. 3 the mould 60 has a base 61 which is secured to or driven by the bottom conveyor (not shown). The mould 60 also has sides 62 which are pivoted at 63 to base 61 and each side 62 has an inwardly extending protuberance 64 on which block 65 may rest. Guides (not shown) elevate the sides 62 to the upstanding position prior to injection of foamable material 66 into the mould 60. Block 65 is then placed in the mould 60 and supported by protuberances 64. Whilst the block 65 passes beneath top conveyor 67 the material 66 is allowed to foam, and fill the available space beneath block 65 to which it becomes bonded. When the block 65 emerges from beneath top conveyor 67, which has prevented lifting of the block 65 during foaming of material 66, guides (not shown) cause sides 62 to swing outwardly and release block 65, with material 66 bonded thereto, so that it may be removed from the bottom conveyor.

Further alternative embodiments may be readily apparent to persons skilled in the art. For example the block of foamed material 32(FIG. 1) may extend beyond one or two edges of the block 31 so that foamed material extends over an adjacent mortar joint when such block is used in the construction of a building. In this way the thermal bridge formed through a wall by the mortar joints may be eliminated.

The mould liner 52 if used could be of paper, polythene, polystyrene or other plastics material, metal foil with or without bitumen facing or other suitable material. The preferred material for use as the foamed insulation is polyurethane due to its low thermal conductivity coefficient. Alternative materials are phenolic or urea formaldehyde, polyisocyanurate, or polyurethane with one or more filler materials. Use of a polythene sheet material causes a water-impermeable "skin" to form on the subsequently exposed surface of the foamed material, in addition to facilitating release of the material from the closure member. This "skin" increases the water ingress resistance of a building structure using blocks formed in accordance with the invention, and also reduces the risk of damage to the foamed material during transportation, storage and use. As an alternative the mould may be lined with a bitumen faced sheet material, for example paper, plastics material or metal foil, to which the foaming material becomes bonded during insulated block manufacture, thus providing a moisture barrier.

For example in the embodiment of FIG. 2 a roll of polythene may be provided, the sheet of such material being withdrawn therefrom and laid into successive mould units 51 or mould liners 52 so as to drape therein. Pressure means, for example, a jet of air may assist in causing the sheet material to be depressed into the mould or mould liner. When foaming of the foamable material takes place, the sheet material is stretched and forced into the extremities of the mould or mould liner, thus giving the insulated block 54a a "shrink-wrapped" water-impermeable skin. Alternatively the mould or mould liners 52 may be retained by the insulated block 54a for this purpose.

As a further modification of the invention the mould may be provided with temperature control means so that, for example, the mould may be kept cold in order that a dense, water-impermeable skin forms on the surface of the foamed material remote from the block.

Means of supporting the block in relation to the mould may be provided as an alternative to the means described heretofore. For example a block or blocks of previously-foamed material may be placed in the mould to support the block and the remaining space filled with material which foams so as to adhere to the block and to the support means. Loss of adhesion of foamed material over the region of the support block or blocks will be small and of little consequence in view of the excellent mechanical keying of the foamed material to the building block.

In addition to the aforementioned physical bonding of the foaming material to the block, the material as it rises to meet the block, has a surface of increased tackiness by comparison with the originally liquid foamable material. In consequence there may be an enhanced adhesion or chemical bond between the foamed material and the block by comparison with applying the foamable material directly to the block. Furthermore blocks often are cold and damp and this can cause problems if the foamable material is applied directly to the block. It is known to heat the blocks so as to avoid such problems but this is a difficult and expensive solution. By foaming the material in the mould so as to rise to the block these problems, caused by a cold block acting as a heat sink and taking heat from the material needed for the foaming process or moisture interfering with the foaming process, are avoided or much reduced.

We claim:

1. A method of manufacturing a thermally insulated building block comprising the steps of
   providing a closure member and a building block, the closure member having a recess shaped and dimensioned to be positionable adjacent an outer surface of the building block to engage the peripheral region of said outer surface and to form, with said outer surface, an enclosed space bounded by said outer surface and an internal surface or surfaces of the closure member recess,
   injecting onto one of the bounding surfaces, prior to positioning the closure member and the block adjacent to each other, a predetermined quantity of foam-forming ingredients, the predetermined quantity being sufficient when foamed to fill the enclosed space,
   positioning the closure member and the block adjacent to and engaging each other thereby defining said enclosed space with the ingredients applied to the surface in the space,
   allowing the ingredients to foam within the space to form a thermal insulating layer substantially covering said outer surface of the block, and
   separating the closure member from the thermally insulated block thus formed.

2. A method according to claim 1, wherein the ingredients are injected onto the outer surface of the block.

3. A method according to claim 1, wherein the ingredients are injected onto a surface of the closure member.

4. An apparatus for manufacturing a thermally insulated building block comprising
   closure means having a recess shaped and dimensioned to cooperate with a building block to form an enclosed space when said closure means is engaged with said block adjacent the periphery of an outer surface thereof, said enclosed space being bounded by said outer surface and the internal surface or surfaces of said recess;
   means for dispensing a predetermined quantity of foam-forming ingredients onto one of said bounding surfaces, said quantity being sufficient when foamed to fill said enclosed space;
   means for moving said block and closure means into engaging juxtaposition with said closure means engaged with said building block in the peripheral region of said outer surface to form said enclosed space, and
   means for maintaining said engaging juxtaposition while said ingredients are foamed to form a layer of thermal insulation substantially covering said outer surface.

5. An apparatus according to claim 4 comprising conveyor means for supporting said building block while said ingredients are foamed.

6. An apparatus according to claim 5, wherein said conveyor means comprises said closure means and wherein said means for maintaining juxtaposition comprises an endless belt disposed above and substantially parallel with said conveyor means.

7. An apparatus according to claim 5, wherein said conveyor means comprises an endless belt and a plurality of moulds retained on said endless belt, each mould comprising a base and walls upstanding therefrom.

8. An apparatus according to claim 7, wherein said walls comprise, at least internally of said mould, a deformable material to facilitate sealing of said block therewith.

9. An apparatus according to claim 6 comprising means for feeding a mould or mould liner onto said conveyor means prior to location of said closure means and said block in engaging disposition.

10. An apparatus according to claim 4 comprising temperature control means operable to control the temperature of said closure means while said foam forming ingredients are foamed.

* * * * *